United States Patent Office 3,259,705
Patented July 5, 1966

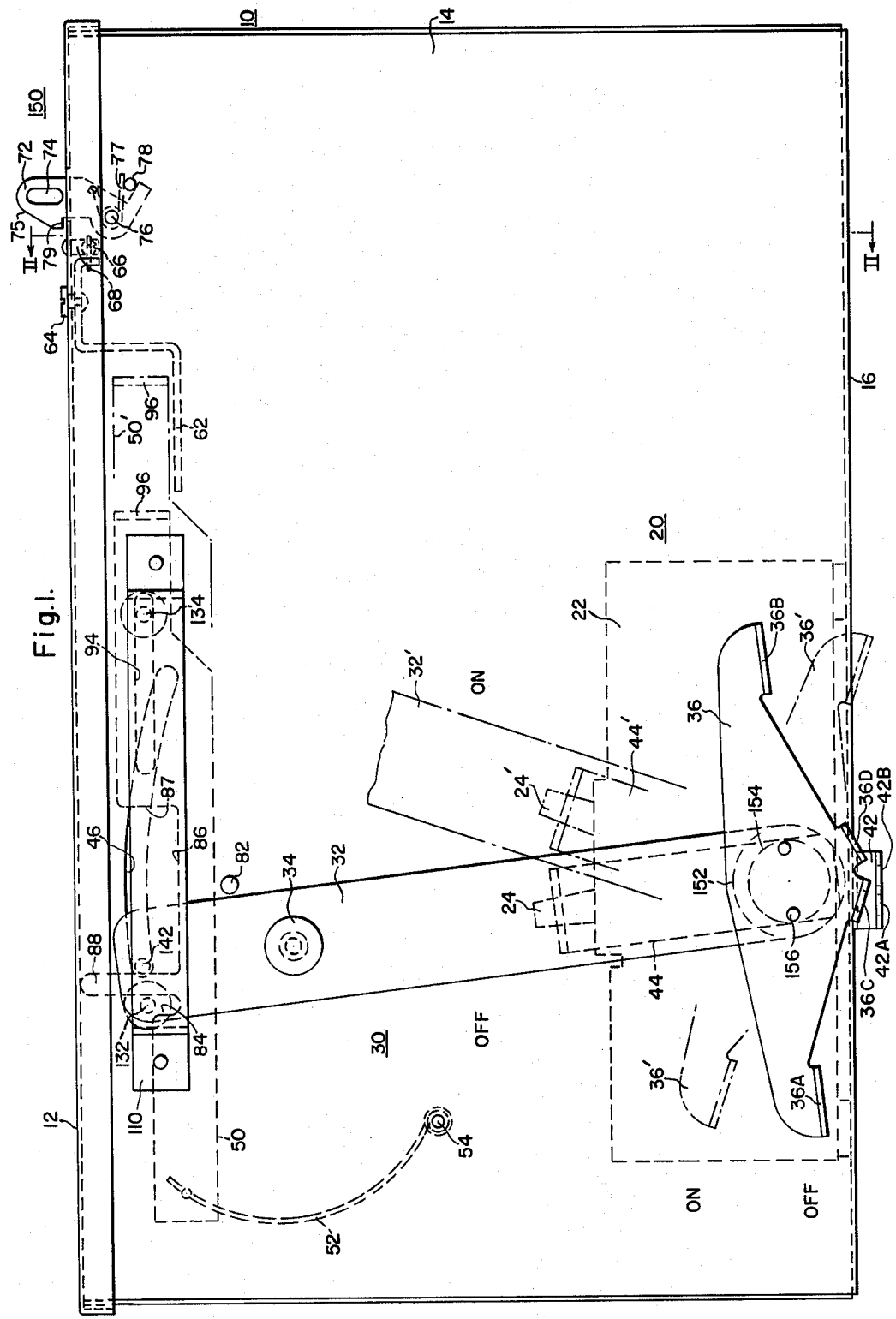

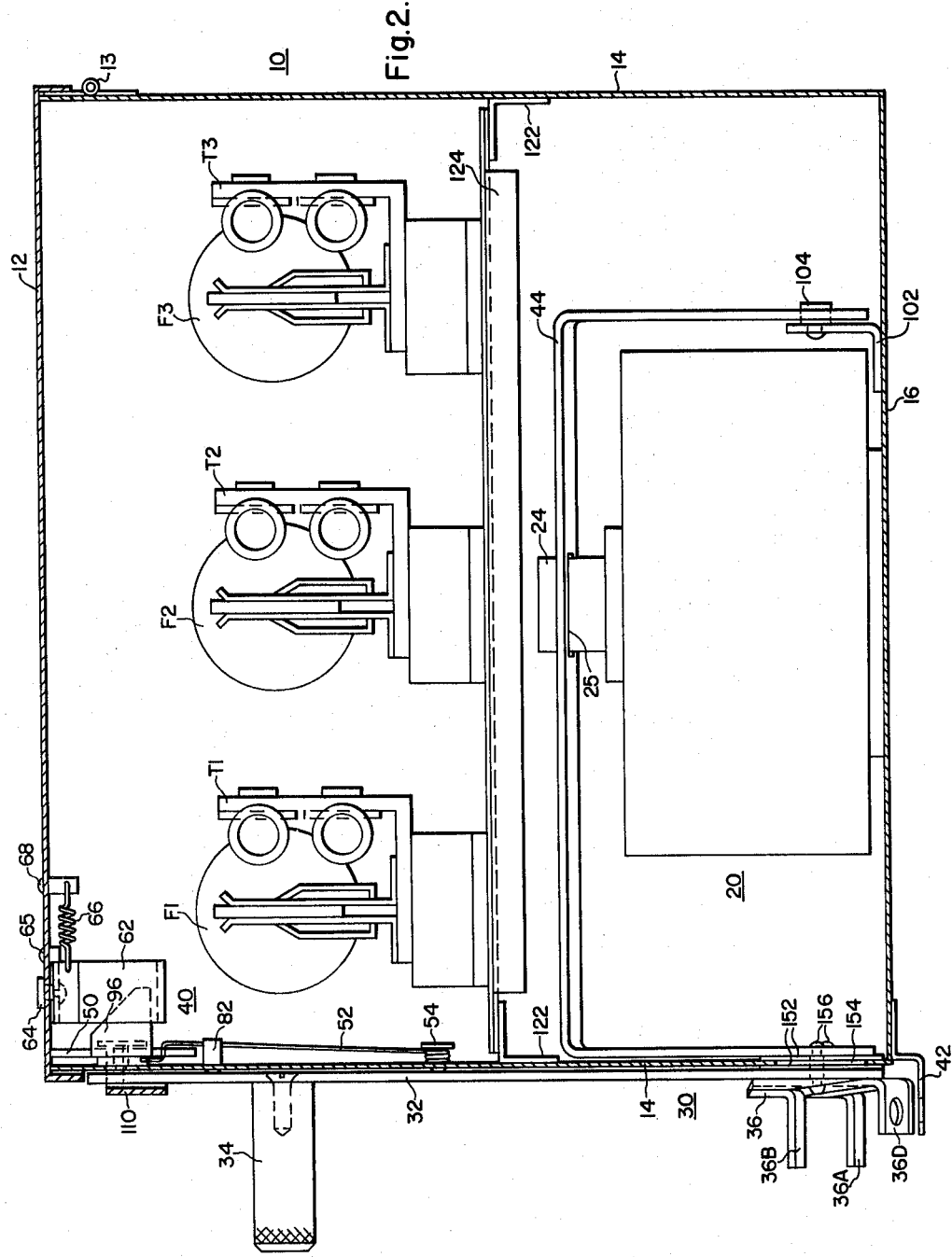

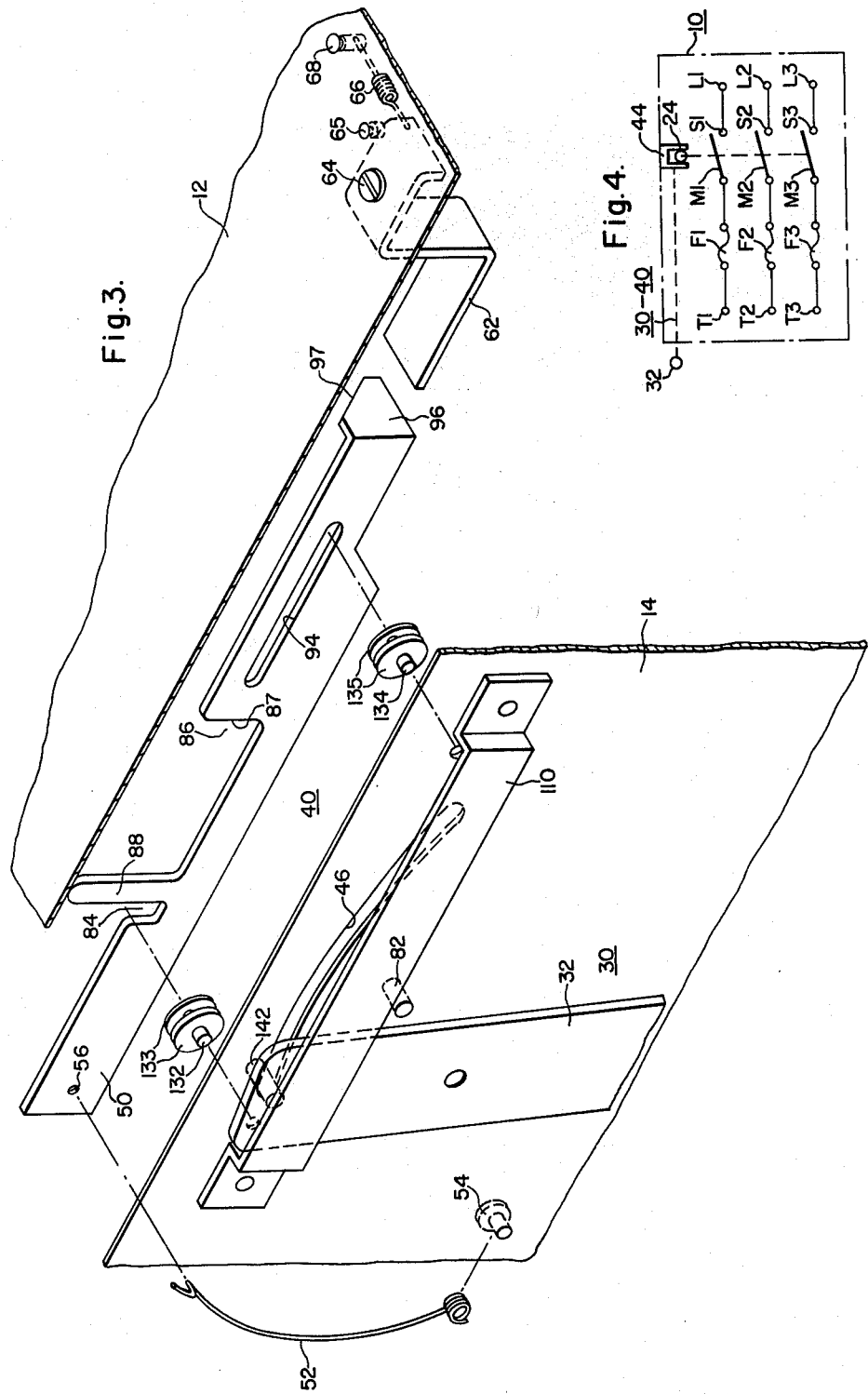

3,259,705
OPERATING MECHANISM FOR ENCLOSED
CIRCUIT INTERRUPTERS
Gerald J. Freese and William W. Hamilton, Jr., Brighton Township, Beaver County, Pa., assignors to Westinghouse Electric Corporation, East Pittsburgh, Pa., a corporation of Pennsylvania
Filed Dec. 10, 1963, Ser. No. 329,571
6 Claims. (Cl. 200—50)

This invention relates to circuit interrupters and, more particularly, to mechanisms for operating switches or circuit breakers which are enclosed in housings or cabinets.

In certain applications, it is desirable that circuit interrupters, such as automatic circuit breakers or manually operable switches, be mounted inside an enclosing housing or cabinet having an external operating member or handle mounted on the outside of the housing. Various mechanical arrangements have been employed in the past for preventing the cover on such a housing from being opened when the circuit interrupter mounted in the housing is in the closed circuit position. Where the external operating member on the housing remains connected to the actuating member on the circuit interrupter inside the housing, even when the cover on the housing is open, a desirable safety feature is to also provide means for preventing the external operating handle from actuating the circuit interrupter to the closed position when the cover is open. It is therefore desirable to provide an improved operating mechanism for circuit interrupters mounted in an enclosing housing or cabinet which offers the advantages of both of the above safety or interlocking construction features.

It is an object of this invention to provide a new and improved operating mechanism for a circuit interrupter enclosed in a housing or cabinet.

Another object of this invention is to provide an improved interlocking arrangement which will prevent the cover of the housing for a circuit interrupter from being opened while the interrupter is closed.

A further object of this invention is to provide an improved interlocking arrangement for an enclosed circuit interrupter which will both prevent the cover of the enclosing housing from being opened while the interrupter is closed and prevent the interrupter from being closed while the cover of the enclosing housing is opened.

A more specific object of this invention is to provide a single interlocking means for preventing the opening of a cover of a housing for a circuit interrupter while the interrupter is closed and for preventing the actuating of the interrupter to the closed position while the cover of the housing is open.

Other objects of the invention will, in part, be obvious and will, in part, appear hereinafter.

For a fuller understanding of the nature and objects of the invention, reference should be had to the following detailed description taken in conjunction with the accompanying drawings in which:

FIGURE 1 is an elevational view of a housing and mechanism for operating a circuit interrupter mounted inside the housing;

FIG. 2 is a view in section, taken along the line II—II in FIG. 1;

FIG. 3 is a partial view, in perspective, of the housing and operating mechanism shown in FIGS. 1 and 2, illustrating the interlocking means included in the operating mechanism; and FIG. 4 is a diagrammatic view illustrating the electrical connections of the circuit interrupter mounted in the housing shown in FIGS. 1 and 2.

Referring now to the drawings and FIGS. 1 and 2 in particular, the structure shown comprises a generally rectangular sheet metal housing or cabinet 10 which includes the side walls 14, the bottom portion 16 and the openable cover 12 which is hinged at one side of the housing 10 by means of the hinges 13. The housing 10 is adapted to receive a circuit interrupter 20 which is mounted inside the housing and, in this instance, a plurality of fuse units F1, F2 and F3. In addition, an operating mechanism 30 is mounted on the housing 10 for actuating the circuit interrupter 20 between the open and closed positions, as well as a cover latching mechanism 50 and an interlocking mechanism 40 for preventing the circuit interrupter from being actuated to the closed position when the cover 12 is opened and for preventing the cover 12 from being opened when the circuit interrupter 20 is in the closed position.

As shown diagrammatically in FIG. 4, the circuit interrupter 20 may be either a manually operable switch of the type described in patent 2,849,572, issued August 26, 1958 to A. R. Cellerini et al. or the interrupter 20 may be a circuit breaker of the automatic type described in Patent No. 2,047,739, issued July 14, 1936 to H. J. Lingal. As described in the aforesaid patent to Cellerini et al., the circuit interrupter 20 may include a plurality of movable contact arms M1, M2 and M3 which are actuable to the open and closed positions with respect to the associated stationary contact members S1, S2 and S3, respectively, by a toggle mechanism which in turn is actuated by an oscillating operating member or handle 24. Each of the movable contact arms M1, M2 and M3 may be connected in series circuit relation with one of the associated fuse units F1, F2 and F3, respectively, between one of the terminals, T1, T2 and T3, and one of the associated line terminals, L1, L2 and L3, respectively as illustrated in FIG. 4. If the circuit interrupter 20 is a circuit breaker of the type described in the aforesaid patent to Lingal, the circuit breaker may be provided with a tripping mechanism which is operable in response to predetermined overload currents to effect automatic opening of the movable contact members. It is to be noted that the fuse units F1, F2 and F3, as shown in FIG. 2, are mounted in side-by-side relationship on the support member 124 which, in turn, is secured to the brackets 122 inside the housing 10 intermediate the circuit interrupter 20 and the cover 12 of the housing 10.

More specifically, the operating mechanism 30 comprises an external operating member or handle 32 which is pivotally or rotatably mounted on one of the side walls 14 of the housing 10 and the internal operating or actuating member 44 which is disposed inside the housing 10. As best shown in FIG. 2, the internal operating member 44 is generally U-shaped in configuration and includes an opening 25 which receives or engages the operating member 24 on the circuit interrupter 20. The right-end of the operating member 44 is rotatably supported on a pivot pin 104 which is mounted on a bracket member 102 which in turn, is secured to the bottom portion 16 of the housing 10 by any suitable means, such as welding. The internal operating member 44 is connected or coupled to the external operating member 32 by the rivets 156 which pass through the spacer or washer members 152 disposed on opposite sides of a bearing member 154 which is disposed in an opening through the side wall 14 of the housing 10 and through which the rivets 156 also pass. The handle 34 is secured to the upper end of the operating member 32 by any suitable means, such as a bolt to facilitate manual rotation of the operating member 32 between predetermined operating positions which correspond to the open and closed positions of the circuit interrupter 20.

In order to assist in retaining the external operating member 32 in proper assembled relationship with the housing 10 and to assist in limiting the travel of the operating member 32 between the different operating positions, the retaining bracket 110 is mounted on the side wall 14 to surround the upper end of the operating member 32 and to permit limited rotation of the operating member 32. In order to facilitate the remote actuation of the operating member 32 by hook sticks or a rope or cable, the cross member 36 is secured to the lower end of the operating member 32 for rotation therewith by the rivets 156. The cross member 36 includes the projecting portions 36A and 36B at the opposite end thereof which may be actuated by a hook stick or by ropes to rotate the operating member 32 between its different operating positions. In addition, the cross member 36 includes the projecting portions 36C and 36D which are disposed at the lower middle portion thereof with each of said projecting portions having an opening extending therethrough to permit padlocking of the operating member 32 in one or the other of its operating positions which correspond to the open and closed positions of the circuit interrupter 20. In order to cooperate with the projecting portions 36C and 36D of the cross member 36, a bracket member 42 is secured to the bottom 16 of the housing 10 and includes the openings 42A and 42B. When the operating member 32 is in one of its operating positions, a padlock may be disposed to pass through the aligned openings through the projecting portion 36C and the opening 42A or in the other position, the padlock may pass through the opening in the projecting portion 36D which will be in aligned relation with the opening 42B in the bracket 42. The operating member 32, as best shown in FIG. 3, also includes an inwardly projecting portion or operating pin 142 which is disposed at the upper end of the operating handle 32 to extend inwardly inside the housing 10 through an arcuate slot 46 in which the pin 142 moves or travels when the operating member 32 is rotated.

In the operation of the operating mechanism 30, when the operating member 32 is manually rotated from the position shown in FIG. 1 which corresponds to the open circuit position of the circuit interrupter 20, to the position indicated in phantom at 32', which corresponds to the closed circuit position of the circuit interrupter 20, the internal operating member 44 rotates with the external operating member 32 from the position shown in FIG. 1 to the position indicated in phantom at 44' to actuate the internal operating member 24 on the circuit interrupter 20 from the position shown in FIG. 1 to the position indicated in phantom at 24' in FIG. 1. Similarly, the cross member 36 also rotates with the operating member 32 from the position shown in FIG. 1, which corresponds to the open circuit position of the circuit interrupter 20 to the position indicated in phantom at 36' in FIG. 1 which corresponds to the closed circuit position of the circuit interrupter 20. It is important to note that the external operating member 32 is connected or coupled to the internal operating member 24 on the circuit interrupter 20 at all times even when the cover 12 is opened.

As best shown in FIGS. 1 and 3, the interlocking mechanism 40 is provided to prevent the cover 12 from being opened when the circuit interrupter 20 is in the closed circuit or "on" position and when the operating member 32 is in a corresponding operating position and also to prevent the operating member 32 from being rotated to actuate the circuit interrupter to the closed circuit or "on" position when the cover 12 is opened. More specifically, the interlocking mechanism 40 comprises an elongated interlocking member 50 which is slidably supported adjacent to one end thereof by the supporting pin 134 which is mounted on the side wall 14 inside the housing 10 adjacent to one end of the arcuate slot 46. The supporting pin 134 passes through the longitudinally extending slot 94 in the interlocking member 50 to permit sliding movement of the interlocking member 50 in a direction which is generally parallel to the plane of the cover 12 and to the plane of the adjacent side wall 14. The supporting pin 132 has disposed thereon a pair of spacers or washers 133 between which the interlocking member 50 moves or travels. The other end of the interlocking member 50 is biased in a generally upwardly direction or in a clockwise direction about the supporting pin 134, as viewed in FIG. 3 by the biasing spring 52. The torsional biasing spring 52 is disposed inside the housing 10 with the lower end of the spring 52 being disposed on the supporting pin 54 which is mounted on the side wall 14 and the upper end of the spring 52 being connected to the left end of the interlocking member 50 through the opening 56. The interlocking member 50 also includes a first recess or slot 86 which extends longitudinally of the interlocking member 50 and in which the pin 142 on the operating member 32 is disposed to travel during at least part of the rotational travel of the operating member 32 and a second recess 84 for a purpose which will be explained hereinafter. In order to prevent the left end of the interlocking member 50 as viewed in FIG. 3 and in FIG. 1 from moving to a position higher than that shown in FIG. 1 under the influence of the force exerted by the biasing spring 52, the upwardly projecting portion 88 is provided on the interlocking member 50 and is disposed to bear against the underside of the cover 12 when the cover 12 is in the closed position.

In order to prevent the cover 12 from being opened when the circuit interrupter 20 is in the closed circuit position and the operating member 32 is in the corresponding position shown in phantom in FIG. 1, the catch member 62 is pivotally supported on the underside of the cover 12 by the screw 64. The defeatable catch member 62 is biased in a counterclockwise direction about the supporting screw 64 as viewed from the top of the cover 12 in FIG. 3 by the tension spring 66 which is connected at one end to the catch member 62 and at the other end to a supporting pin 68 which is mounted on the underside of the cover 12. The stop pin 65 is mounted on the underside of the cover 122 to prevent further counterclockwise rotation of the catch 62 beyond the position shown in FIG. 3 under the influence of the spring 66. When the operating member 32 is rotated or actuated from the position shown in FIGURE 1 which corresponds to the open circuit or "off" position of the circuit interrupter 20 in a clockwise direction to the position indicated in phantom in FIG. 1 which corresponds to the closed circuit or "on" position of the circuit interrupter 20, the pin 142 on the operating handle 32 initially travels in the recess 86 in the interlocking member 50 until the pin 142 engages the shoulder 87 on the interlocking member 50 and actuates the interlocking member 50 to slidably move toward the right until a transversely extending portion 96 on the interlocking member 50 engages the catch member 62, as indicated in phantom at 50' in FIG. 1, to thereby prevent the cover 12 from being opened when the circuit interrupter 20 is in the closed circuit position. It is to be noted that the catch member 62 is defeatable by the use of a screwdriver or similar tool which may be employed to rotate the screw 64 and the catch member 62 in a clockwise direction about the screw 64 away from engagement with the interlocking member 50 against the force of the biasing spring 66 to permit the intentional opening of the cover 12 when the circuit interrupter 20 is in the closed circuit position and the operating member 32 is in the position indicated in phantom in FIG. 1 for maintenance or other purposes. It is to be noted that the biasing spring 66 will restore the catch member 62 to its normal position shown in FIGS. 1 and 3 when the screwdriver or other tool is removed from engagement with the screw 64.

In order to prevent the circuit interrupter 20 from being actuated to the closed circuit position by the external operating member 32 when the cover 12 is open, the interlocking pin 132 which may be of the same type as the supporting pin 134 previously described, is mounted inside the housing 10 on the side wall 14 adjacent to and normally above the recess 84 in the interlocking member 50, as best shown in FIGS. 1 and 3. When the cover 12 is opened or removed from the housing 10, the left end of the interlocking member 50 will move generally upwardly or in a clockwise direction about the supporting pin 134 from the position shown in FIG. 1 since the projecting portion 88 will no longer bear against the underside of the cover 12 and the slot or recess 84 will then engage the interlocking pin 132. When the interlocking pin 132 engages the slot or recess 84 in the interlocking member 50, the interlocking member 50 is prevented from moving slidably to the right when engaged by the pin 142 on the operating member 32 and the operating member 32 is thereby prevented from being rotated from the position shown in FIG. 1 to the position indicated in phantom in FIG. 1 to actuate the circuit interrupter to the closed circuit position. It is to be noted that when the cover 12 is in the closed position shown in FIG. 1, the upwardly projecting portion 88 on the interlocking member 50 bears against the underside of the cover 12 to maintain the left end of the interlocking member 50 below the interlocking pin 132 and the interlocking member 50 is free to slidably travel toward the right when actuated by the pin 142 on the operating member 32 to thereby permit rotational travel of the operating member 32 to the position which corresponds to the closed circuit position of the circuit interrupter 20. The spacers or washers 133 disposed on the interlocking pin 132 assist in retaining the interlocking member 50 in proper spaced relationship with respect to the side wall 14 during the sliding movement or travel of the interlocking member 50. The upper surface of the left end of the interlocking member 50 also acts as a bearing surface for the interlocking member 50 during the sliding movement or travel of the interlocking member 50 since the latter surface bears against the interlocking pin 132 the latter travel and prevents the upwardly projecting portion 88 from bearing against the underside of the cover 122 during the sliding travel of the interlocking member 50. A stop pin 82 is disposed on the side wall 14 underneath the interlocking member 50 to prevent the cover 12 from being forcibly opened when the interlocking member 50 is engaging the catch 62 in the closed circuit position of the interrupter 20 without defeating the catch 62. If this type of forcible opening were attempted tending to rotate the interlocking member 50 about the pin 134, the pin 82 prevents rotation of the member 50 against the force of the spring 52.

The torsion spring 52 also forms a toggle mechanism with the interlocking member 50 to retain the interlocking member 50 in the position shown in FIG. 1 when the interrupter 20 is open and to retain the interlocking member 50 in engaged relationship with the catch 62 when the interrupter 20 is in the closed circuit position. This is because the line of action of the spring 52 changes in direction as the connection between the spring 52 and the interlocking member 50 moves to the right or left of a point directly above the pin 54 in the line of travel of the member 50.

In order to latch the cover 12 closed independently of the position of the operating member 32, the cover latching mechanism 50 is disposed on the housing 10. The cover latching mechanism 50 comprises a latch 72 which is pivotably supported on one of the side walls 14 by the pivot pin 76. The torsion spring 77 is disposed on the pivot pin 76 to bias the latch 72 in a counterclockwise direction about the pivot pin 76, as viewed in FIG. 1, with one end of the torsion spring 77 engaging a recess in the latch 72 and the other end of the torsion spring 77 bearing against a stop pin 78 which is mounted on the adjacent side wall 14. The stop pin 78 also prevents further counterclockwise rotation of the latch 72 about the pivot pin 76 beyond the position shown in FIG. 1. When the cover 12 is moved to the closed position, the top of the latch 72 enters an opening provided in the cover 12 and the edge of the opening engages a cam surface 75 provided on the latch 72 to prevent slamming of the cover 12 to the closed position and the latch 72 is rotated slightly in a clockwise direction against the force of the biasing spring 77 until the cover clears a shoulder portion 79 provided on the latch 72 and the latch 72 returns to the position shown in FIG. 1 under the influence of the force of the torsion spring 77. The cover is thereby retained in the closed position independently of the position of the operating member 32 and the circuit interrupter 20. To release the cover latching mechanism 50, the latch 72 may be manually rotated in a clockwise direction about the pivot pin 76 until the shoulder portion 79 clears the opening provided in the cover and the cover may then be rotated to the open position. The latch 72 also includes an opening 74 to permit padlocking of the cover 12 in the closed position.

It is to be noted that if the cover 12 is open for maintenance or other purposes while the catch member 62 is held in the defeated position previously described, to permit opening of said cover while the circuit interrupter 20 is in the closed circuit position, the cover 12 may then be reclosed without actuating the circuit interrupter 20 to the open circuit position since a cam surface 97 is provided on the transversely extending portion 96 on the interlocking member 50 as best shown in FIG. 3. When the cover 12 is reclosed under such circumstances, the cam surface 97 will engage the catch member 62 and temporarily rotate the catch member 62 to its defeated position against the force of the biasing spring 66 to permit the interlocking member 50 to engage the catch member 62, as shown in phantom in FIG. 1, with the catch member 62 being returned to its normal position as shown in FIGS. 1 and 3, by the spring 66.

It is also to be noted that the operative connection between the operating member 32 and the interlocking mechanism 40 and more specifically the interlocking member 50 includes a certain degree of lost motion, since the pin 142 on the operating member 32 does not engage the shoulder portion 87 on the interlocking member 50 until the latter portion of the rotational travel of the operating member 32 from the position in FIG. 1 to the position indicated in phantom in FIG. 1. Similarly, when the operating member 32 is actuated from the position indicated in phantom at 32' in FIG. 1 which corresponds to the closed circuit position of the interrupter 20, a certain amount of lost motion is provided in the operative connection between the operating member 32 and the interlocking member 50 since the pin 142 will not engage the upwardly extending portion 88 of the interlocking member 50 to return the interlocking member 50 to the position shown in FIG. 1 until the latter portion of the rotational travel of the operating member 32 from the position indicated in phantom in FIG. 1 to the position indicated at 32 in FIG. 1 which corresponds to the open circuit position of the circuit interrupter 20. The main purpose of the lost motion provided in the disclosed construction is to permit a reduction in the length of the interlocking member 50 and in a more compact construction of the housing 10.

It is to be understood that the housing 10 and the interrupter 20 may be employed as a plug-in interrupter unit for use with associated bus duct equipment by providing stab conductors (not shown) on the circuit interrupter 20 which would extend downwardly or outwardly from the bottom or back portion 16 of the housing 10 to engage the conductors in the associated bus duct equipment.

The apparatus embodying the teachings of this invention has several advantages. For example, a single interlocking member is provided to prevent both the opening of the cover 12 when a circuit interrupter 20 is in the closed circuit position and to prevent the operating member 32 from being actuated to move the operating member 24 on the circuit interrupter 20 from the open circuit position to the close circuit position when the cover 12 is open. It is to be noted that for one of its interlocking functions the interlocking member 50 is arranged to slidably travel to engage the catch member 62 on the cover 12 while for its other interlocking function the interlocking member 50 is disposed to rotate about the supporting pin 134 until the recess 84 engages the interlocking pin 132. In other words, the unitary interlocking member, as disclosed, slidably moves rectilinearly in a plane which is generally parallel to the cover 12 in its closed position when carrying out one of its interlocking functions and moves rotatably in a second plane which is generally perpendicular to the plane of the cover 12 in its closed position when carrying out its second interlocking function. Another important advantage of this disclosed construction is that the safety interlocking provided is actuated entirely from the external operating member, as disclosed, rather than from the internal operating member 44 or from the operating parts of the circuit interrupter 20 which are relatively inaccessible due to the interposing of the fuse units F1 through F3 between the circuit interrupter 20 and the top cover 12 of the housing 10.

Since numerous changes may be made in the above described apparatus and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. In combination, a circuit interrupter having a movable operating member for opening and closing the interrupter, an enclosure in which the interrupter is mounted, said enclosure having an openable top cover with a catch thereon and side walls, means disposed in said enclosure for actuating said operating member to open and close said interrupter, an external operating member rotatably mounted on one of said side walls and connected to said actuating means, an interlocking member slidably supported adjacent to one end thereof on said one of said side walls adjacent to the catch, means disposed on said one of said walls for biasing a portion of the interlocking member adjacent the other end of the interlocking member upwardly to bear against said cover when said cover is closed, said external operating member having a portion extending through the side wall to drive said interlocking member generally parallel to said cover into engagement with said catch on the cover to prevent opening of the cover when the interrupter is closed, and a projecting member disposed on said one of said walls to be engaged by a portion of said interlocking member adjacent said other end of said interlocking member when the cover is opened to permit upward movement of said other end of said interlocking member to thereby prevent sliding movement of said interlocking member and the closing of said interrupter.

2. In combination, a circuit interrupter having a movable operating member for actuating the interrupter between predetermined positions, an enclosure in which the interrupter is mounted, said enclosure having side walls and an openable cover with a catch thereon, an actuating member rotatably mounted inside said enclosure to engage and drive said operating member to thereby actuate said interrupter between said positions, an external operating member rotatably mounted on one of said side walls and extending inside said enclosure to actuate said actuating member, a latch member slidably supported adjacent to one end on one of said side walls adjacent to the catch for rectilinear movement generally parallel to the plane of said cover, said external operating member extending into said enclosure to engage and slidably actuate said latch member into and out of engagement with the catch on said cover to prevent opening of the cover when the interrupter is in one predetermined position and to permit opening when the cover is in another predetermined position, biasing means disposed on said one of said walls to rotate the other end of said latch member toward the cover to actuate a portion of said latch member to bear against said cover when said cover is closed, and means disposed on said one of said walls inside said enclosure to engage said latch member adjacent to said other end of said latch member when the cover is opened and said biasing means rotates said other end of said latch member to prevent actuation of said interrupter by said external operating member to said one predetermined position.

3. An enclosing housing for a circuit interrupter having an actuating handle movable between predetermined positions comprising a plurality of side walls, a bottom portion, an openable top cover having a catch thereon, means disposed inside said housing for driving said handle between said positions, an external operating member rotatably mounted on one of said side walls adjacent to said bottom portion and operatively connected to said driving means, an interlocking member slidably mounted adjacent to one end thereof on said one of said side walls inside said housing adjacent to the catch on said cover, means connected to said interlocking member adjacent the other end of said interlocking member away from the catch for biasing a portion of said interlocking member adjacent said other end of said interlocking member to bear upwardly against said cover, means connected to said external operating member and extending into said housing for engaging and actuating said interlocking member to slidably drive said one end generally parallel to said cover into engagement with said catch to prevent opening of said cover when the actuating handle of said interrupter is driven to one of said positions, and projecting means disposed on said one of said walls inside said housing to engage a portion of said interlocking member adjacent said other end of the interlocking member when said biasing means moves said other end of said interlocking member generally transversely with respect to the sliding movement of said interlocking member upon the opening of said cover to prevent sliding movement of said interlocking member and rotatable movement of said external operating member to drive the actuating handle of said interrupter to said one position.

4. An enclosing housing adapted to receive a circuit interrupter having disposed thereon an operating handle actuable between two predetermined positions comprising a base member including side wall portions, an openable cover disposed on top of said base member and having a catch thereon, an external operating member rotatably mounted on one of said side wall portions, an internal operating member rotatably mounted on said base member and connected to said external operating member to engage the operating handle on said interrupter and actuate said handle between said predetermined positions when said external operating member is reciprocated between corresponding positions, an interlocking member slidably mounted inside said base member adjacent to one end thereof on one of said side wall portions adjacent to the catch on said cover, biasing means disposed on said one of said side wall portions for rotating the other end of said interlocking member to actuate a portion of said interlocking member upwardly to bear against said cover, said external operating member including an inwardly projecting portion to actuate said interlocking member generally parallel to said cover to slidably engage the catch on said cover and prevent its opening when the handle on said interrupter is actuated to one of its positions, a projecting member mounted on the side wall portion adjacent to said other end of said interlocking member to engage said interlocking member adjacent to said other end when said cover is opened to prevent sliding movement of said interlocking member and actuation of the handle on said interrupter to said one of its positions and means extending through said cover to actuate the catch out of engagement with the interlocking member when the interrupter is actuated to said one of its positions to permit opening of the cover.

5. An operating mechanism for a circuit interrupter having an actuating handle and disposed in an enclosure having side walls and an openable cover with a catch thereon comprising means disposed inside said enclosure for engaging and driving said handle to open and close said interrupter, an external operating member rotatably mounted on one of said side walls and extending into said enclosure to actuate said driving means, an interlocking member slidably supported at one end on one of said walls adjacent to the catch and operatively connected to said external operating member to be slidably actuated thereby in a direction generally parallel to said cover, means disposed on said one of said side walls for biasing the other end of said interlocking member for rotation upwardly against said cover, said one end of said interlocking member being actuated by said external operating member to engage said catch and prevent opening of said cover when the interrupter is closed and to be disengaged therefrom when the interrupter is open, and means disposed on the side wall adjacent said interlocking member to engage said interlocking member adjacent to said other end of said interlocking member and prevent sliding movement of said interlocking member when the cover is open and said biasing means actuates the other end of said interlocking member upwardly to prevent rotation of said external operating member to close said interrupter.

6. An operating mechanism for a circuit interrupter having an actuating handle and mounted in an enclosure having side walls and an openable cover with a catch thereon comprising an internal operating member rotatably mounted inside said enclosure to engage said actuating handle, an external operating member rotatably mounted on one of said side walls and connected to said internal member for actuating the handle of said interrupter between predetermined positions, and an interlocking member slidably mounted adjacent to one end on said one of said walls adjacent to the catch, means disposed on said one of said side walls for biasing the other end for upward rotation to actuate a portion of said interlocking member against said cover when the cover is closed, said external operating member having an inward projection disposed to engage said interlocking member and slidably move said one end of said interlocking member into engagement with the catch on said cover to prevent opening of said cover when the handle on said interrupter is actuated to one of said positions, said interlocking member having a recess therein adjacent to said other end and a pin disposed on said one of said side walls disposed to engage the recess on said interlocking member when the cover is opened and said other end of said interlocking member is biased upwardly toward said cover to prevent sliding movement of said interlocking member and actuation of the handle on said interrupter to said one of said positions.

References Cited by the Examiner

UNITED STATES PATENTS

| | | | |
|---|---|---|---|
| 1,288,739 | 12/1918 | Sutherland | 200—50 |
| 3,141,074 | 7/1964 | Rexroad | 200—50 |
| 3,170,997 | 2/1965 | Herrmann | 200—50 |
| 3,171,908 | 3/1965 | Malota | 200—50 |

KATHLEEN H. CLAFFY, *Primary Examiner.*

M. GINSBURG, *Assistant Examiner.*